(12) United States Patent
Nakatani (10) Patent No.: US 12,129,007 B2
(45) Date of Patent: Oct. 29, 2024

(54) CONTROL SYSTEM FOR POSTURE CONTROL TABS OF MARINE VESSEL, MARINE VESSEL, AND METHOD FOR CONTROLLING POSTURE CONTROL TABS OF MARINE VESSEL THAT ARE CAPABLE OF ASSISTING OPERATIONS OF STEERING CONTROL

(71) Applicant: YAMAHA HATSUDOKI KABUSHIKI KAISHA, Iwata (JP)

(72) Inventor: Jun Nakatani, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 293 days.

(21) Appl. No.: 17/899,679

(22) Filed: Aug. 31, 2022

(65) Prior Publication Data

US 2022/0411037 A1 Dec. 29, 2022

Related U.S. Application Data (62) Division of application No. 17/035,801, filed on Sep. 29, 2020, now Pat. No. 11,465,726.

(30) Foreign Application Priority Data

Oct. 11, 2019 (JP) ................................. 2019-187886

(51) Int. Cl.
*B63H 25/44* (2006.01)
*B63B 39/06* (2006.01)

(52) U.S. Cl.
CPC ........... *B63H 25/44* (2013.01); *B63B 39/061* (2013.01)

(58) Field of Classification Search
CPC ....... B63B 39/061; B63B 39/00; B63H 25/44; B63H 25/00; G05D 1/0875
See application file for complete search history.

(56) References Cited

U.S. PATENT DOCUMENTS

| 7,311,058 B1 * | 12/2007 | Brooks ................... B63B 79/10 114/285 |
| 7,506,599 B2 * | 3/2009 | Mizutani ................ B63H 20/12 114/144 R |
| 7,533,624 B2 * | 5/2009 | Mizutani ................ B63H 20/12 114/144 R |
| 8,261,682 B1 * | 9/2012 | DeVito ................ G05D 1/0875 701/21 |
| 9,278,740 B1 * | 3/2016 | Andrasko ............ G05D 1/0875 |

OTHER PUBLICATIONS

Nakatani, "Control System for Posture Control Tabs of Marine Vessel, Marine Vessel, and Method for Controlling Posture Control Tabs of Marine Vessel That Are Capable of Assisting Operations of Steering Control", U.S. Appl. No. 17/035,801, filed Sep. 29, 2020.

* cited by examiner

*Primary Examiner* — Anthony D Wiest
(74) *Attorney, Agent, or Firm* — Keating & Bennett, LLP

(57) ABSTRACT

A control system for posture control tabs of a marine vessel assists operations of a steering control. The posture control tabs are mounted on a stern of a hull to move up or down to control a posture of the hull. Actuators actuate the respective posture control tabs. When a steering instruction is provided through the steering control, a processor determines the posture control tab to be actuated and controls the actuator corresponding to the posture control tab determined to be actuated so as to change the position of the determined posture control tab.

7 Claims, 7 Drawing Sheets

FIG. 7

CONTROL SYSTEM FOR POSTURE CONTROL TABS OF MARINE VESSEL, MARINE VESSEL, AND METHOD FOR CONTROLLING POSTURE CONTROL TABS OF MARINE VESSEL THAT ARE CAPABLE OF ASSISTING OPERATIONS OF STEERING CONTROL

CROSS REFERENCE TO RELATED APPLICATIONS

This application claims the benefit of priority to Japanese Patent Application No. 2019-187886 filed on Oct. 11, 2019. The entire contents of this application are hereby incorporated herein by reference.

BACKGROUND OF THE INVENTION

1. Field of the Invention

The present invention relates to control systems for posture control tabs of a marine vessel, marine vessels, and methods for controlling posture control tabs of a marine vessel that are capable of assisting steering operations of a steering control.

2. Description of the Related Art

In marine vessels, a steering control like a steering wheel is typically used for giving instructions for controlling or changing the direction in which the marine vessel moves. In marine vessels including a propulsion device like an outboard motor that generates a propulsive force to move a hull, the propulsion device is used to control the direction in which the hull moves according to steering instructions given through the steering control. Marine vessels having posture control tabs like trim tabs for controlling the posture of a hull are also known as shown in, for example, U.S. Pat. No. 8,261,682 and Zipwake "Dynamic Trim-Control System" (URL: http://www.zipwake.com; hereafter referred to as Zipwake). Posture control tabs are mounted on the stern of a hull such that they are able to swing or protrude with respect to a retracted position at which the posture control tabs are not used. Furthermore, Japanese Laid-open Patent Publication (Kokai) No. S64-44396 discloses a control to raise or lower a trim tab as a posture control tab in conjunction with a steering operation of a steering wheel.

When a steering wheel is operated to change the direction in which a marine vessel having posture control tabs moves, an operation force necessary to operate the steering wheel for turning of the marine vessel may be different between left turning and the right turning, depending on the trim position of the outboard motor. Accordingly, there was room for improvement in utilizing the posture control tabs to assist the steering operation of the steering wheel.

SUMMARY OF THE INVENTION

Preferred embodiments of the present invention provide control systems for posture control tabs of a marine vessel, marine vessels, and methods for controlling posture control tabs of a marine vessel, which are each capable of assisting steering operations of a steering control as needed.

According to a preferred embodiment of the present invention, a control system for posture control tabs of a marine vessel includes a port side posture control tab and a starboard side posture control tab mounted on a port side and a starboard side of a stern of a hull to move up or down to control a posture of the hull. The control system further includes a port side actuator and a starboard side actuator configured to respectively actuate the port side posture control tab and the starboard side posture control tab. The control system further includes an instruction acquisition unit configured to acquire a steering instruction provided by a steering control that provides instructions to control the direction in which the hull moves. The control system further includes a trim position acquisition unit configured to acquire a trim position of a propulsion device that generates a propulsive force to move the hull. The control system further includes a processor configured or programmed to, upon the instruction acquisition unit acquiring the steering instruction, execute a first control. The first control determines a posture control tab to be actuated among the port side posture control tab and the starboard side posture control tab based on the trim position acquired by the trim position acquisition unit, and controls one of the port side actuator and the starboard side actuator corresponding to the determined posture control tab so as to change the position of the determined posture control tab.

According to another preferred embodiment of the present invention, a control system for posture control tabs of a marine vessel includes a port side posture control tab and a starboard side posture control tab mounted on a port side and a starboard side of a stern of a hull to move up or down to control a posture of the hull. The control system further includes a port side actuator and a starboard side actuator configured to respectively actuate the port side posture control tab and the starboard side posture control tab. The control system further includes an instruction acquisition unit configured to acquire a steering instruction provided by a steering control that provides instructions to control a direction in which the hull moves. The control system further includes a processor configured or programmed to, upon the instruction acquisition unit acquiring the steering instruction provided by the steering control at a faster operation speed than a predetermined operation speed, execute a first control. The first control determines a posture control tab to be actuated among the port side posture control tab and the starboard side posture control tab based on the direction of a change in movement of the hull instructed by the steering instruction, and controls one of the port side actuator and the starboard side actuator corresponding to the determined posture control tab so as to change the position of the determined posture control tab.

According to another preferred embodiment of the present invention, a control system for posture control tabs of a marine vessel includes a port side posture control tab and a starboard side posture control tab mounted on a port side and a starboard side of a stern of a hull to move up or down to control a posture of the hull. The control system further includes a port side actuator and a starboard side actuator configured to respectively actuate the port side posture control tab and the starboard side posture control tab. The control system further includes an instruction acquisition unit configured to acquire a steering instruction provided by a steering control that provides instructions to control a direction in which the hull moves. The control system further includes a processor configured or programmed to, in a first steering mode, control a propulsion device that generates a propulsive force to move the hull according to the acquired steering instruction, control a direction in which the hull moves, and in a second steering mode, control the port side actuator and the starboard side actuator according to the acquired steering instruction. The processor in the first steering mode determines whether or not an abnormality has occurred that the direction in which the hull moves is not controlled with the propulsion device according to the steering instruction, and upon determining that the abnormality has occurred switches from the first steering mode to the second steering mode.

According to another preferred embodiment of the present invention, a marine vessel includes a hull, a steering control that provides instructions to control a direction in which the hull moves, a propulsion device that generates a propulsive force to move the hull, and one of the above-described posture control systems.

According to a preferred embodiment of the present invention, when a steering instruction is acquired in the control system for posture control tabs of a marine vessel, a posture control tab to be actuated is determined based on the trim position acquired, and a corresponding actuator is controlled to actuate the determined posture control tab to change the position of the determined posture control tab. This causes steering operations to be assisted as necessary.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

First Preferred Embodiment

Figure 1:
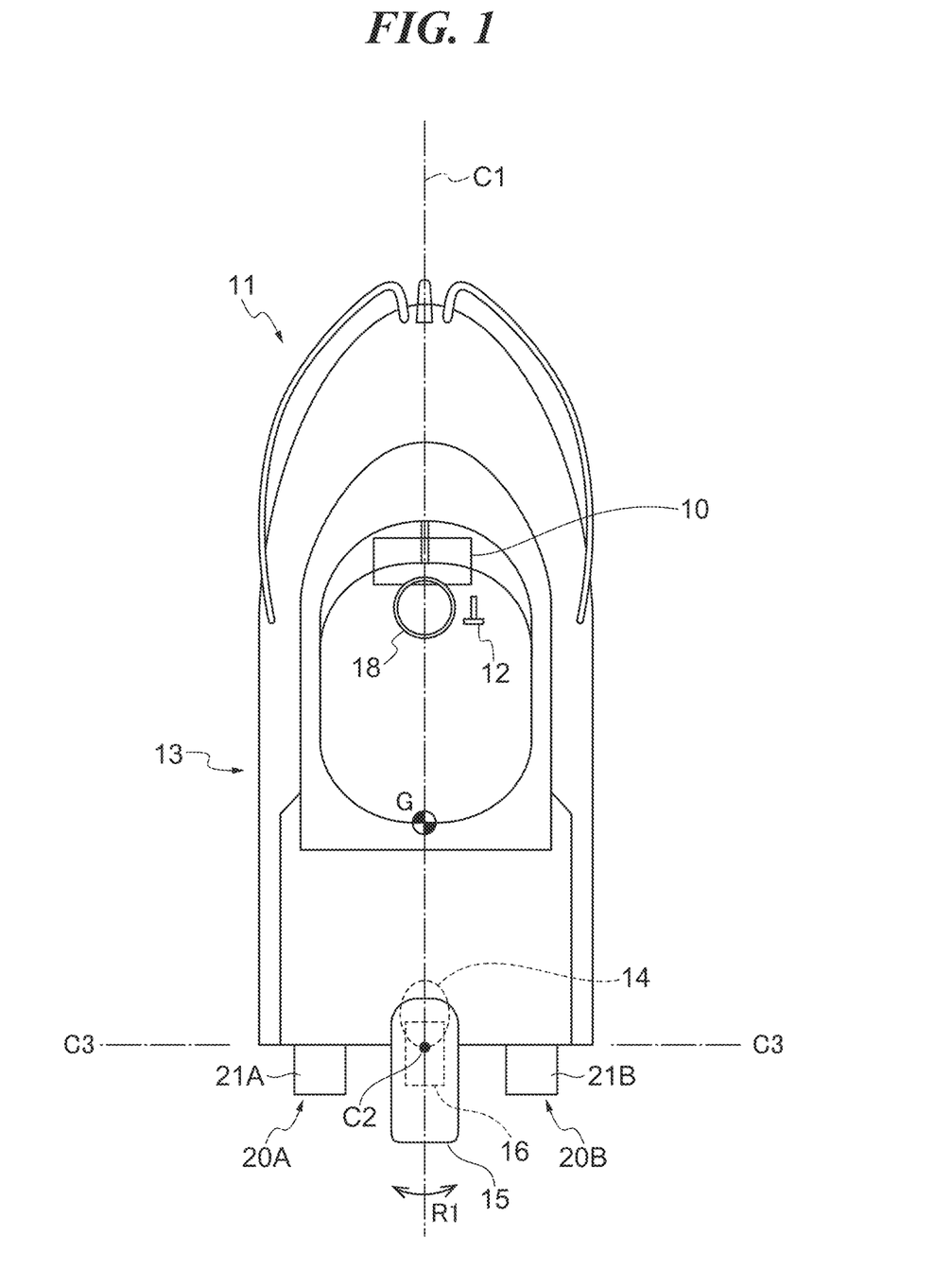
FIG. 1 is a top view of a marine vessel to which a posture control system for a hull according to a preferred embodiment of the present invention is provided.

First, a description is given of the first preferred embodiment. FIG. 1 is a top view of a marine vessel to which a posture control system for a hull according to the first preferred embodiment is provided. A marine vessel 11 includes a hull 13, an outboard motor 15 defining and functioning as a marine propulsion device mounted on the hull 13, and a plurality of (for example, a pair of) trim tab units (trim tab units 20A and 20B in FIG. 1). A central unit 10, a steering wheel 18, and a throttle lever 12 are provided in the vicinity of a cockpit in the hull 13.

In the following description, a fore-and-aft direction, a crosswise direction, and a vertical direction refer to a fore-and-aft direction, a crosswise direction, and a vertical direction, respectively, of the hull 13. For example, as shown in FIG. 1, a centerline C1 extending in the fore-and-aft direction of the hull 13 passes through the center of gravity G of the marine vessel 11. The fore-and-aft direction is the direction along the centerline C1. Fore or front refers to the direction toward the upper side of the view along the centerline C1. Aft or rear refers to the direction toward the lower side of the view along the centerline C1. The crosswise direction is defined based on a case in which the hull 13 is viewed from the rear. The vertical direction is vertical to the fore-and-aft direction and the crosswise direction.

The outboard motor 15 is mounted on a stern of the hull 13. The outboard motor 15 is mounted on the hull 13 via a mounting unit 14. The outboard motor 15 includes an engine 16, which is, for example, an internal combustion engine. The outboard motor 15 generates a propulsive force to move the hull 13 by a propeller (not shown) that is turned by a driving force of the engine 15.

The mounting unit 14 includes a swivel bracket, a clamp bracket, a maneuvering shaft, and a tilt shaft (none of which are illustrated). The mounting unit 14 further includes a power trim and tilt mechanism (PTT mechanism) 23 (see FIG. 3). The PTT mechanism 23 turns the outboard motor 15 about the tilt shaft. This makes it possible to change an inclination angle (a trim angle or a tilt angle) of the outboard motor 15 with respect to the hull 13, and hence a trim adjustment is made and the outboard motor 15 is tilted up or down. Moreover, the outboard motor 15 is able to turn about a turning center C2 (about the steering shaft) with respect to the swivel bracket. Operating the steering wheel 18 causes the outboard motor 15 to turn about the turning center C2 in the crosswise direction (direction R1). This controls the direction in which the marine vessel 11 moves.

The pair of trim tab units 20A and 20B are mounted on the stern on the port side and the starboard side such that they are able to swing about a swing axis C3. To distinguish the two trim tab units 20A and 20B from each other, the one located on the port or left side is referred to as the "trim tab unit 20A", and the one located on the starboard or right side is referred to as the "trim tab unit 20B". The trim tab units 20A and 20B includes a tab 21A (port side posture control tab) and a tab 21B (starboard side posture control tab), respectively.

Figure 2:
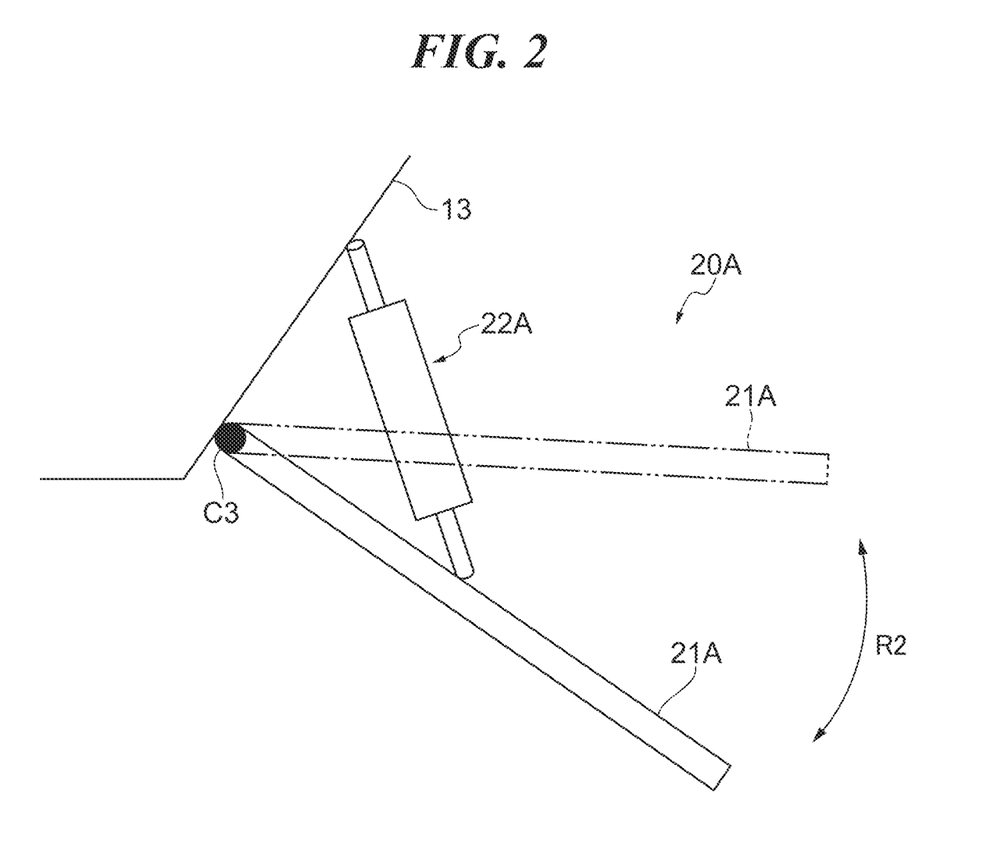
FIG. 2 is a side view of a trim tab unit attached to a hull.

FIG. 2 is a side view of the trim tab unit 20A attached to the hull 13. The trim tab units 20A and 20B have the same construction, and thus a construction of only the trim tab unit 20A will be described as a representative example. The trim tab unit 20A includes a trim tab actuator 22A and a tab 21A. The tab 21A is attached to the rear of the hull 13 such that it is able to swing about the swing axis C3. For example, the proximal end of the tab 21A is attached to the rear of the hull 13, and the free end of the tab 21A swings up and down (in a swinging direction R2) about the swing axis C3. The tab 21A is an example of a posture control tab that controls the posture of the hull 13 by moving up or down.

The trim tab actuator 22A is disposed between the tab 21A and the hull 13 such that it connects the tab 21A and the hull 13 together. The trim tab actuator 22A actuates the tab 21A to swing it with respect to the hull 13. It should be noted that the tab 21A indicated by the chain double-dashed line in FIG. 2 is at a position where its free end is at the highest level (position where the tab-lowering amount is 0%), and this position corresponds to a retracted position. The tab 21A indicated by the solid line in FIG. 2 is at a position where its free end is at a lower level than a keel at the bottom of the marine vessel 11. It should be noted that a range in which the tab 21A is able to swing is not limited to the one illustrated in FIG. 2. The swinging direction R2 is defined with reference to the swing axis C3. The swing axis C3 is perpendicular or substantially perpendicular to the centerline C1 and parallel or substantially parallel to, for example, the crosswise direction. It should be noted that the swing axis C3 may extend diagonally so as to cross the turning center C2.

Figure 3:
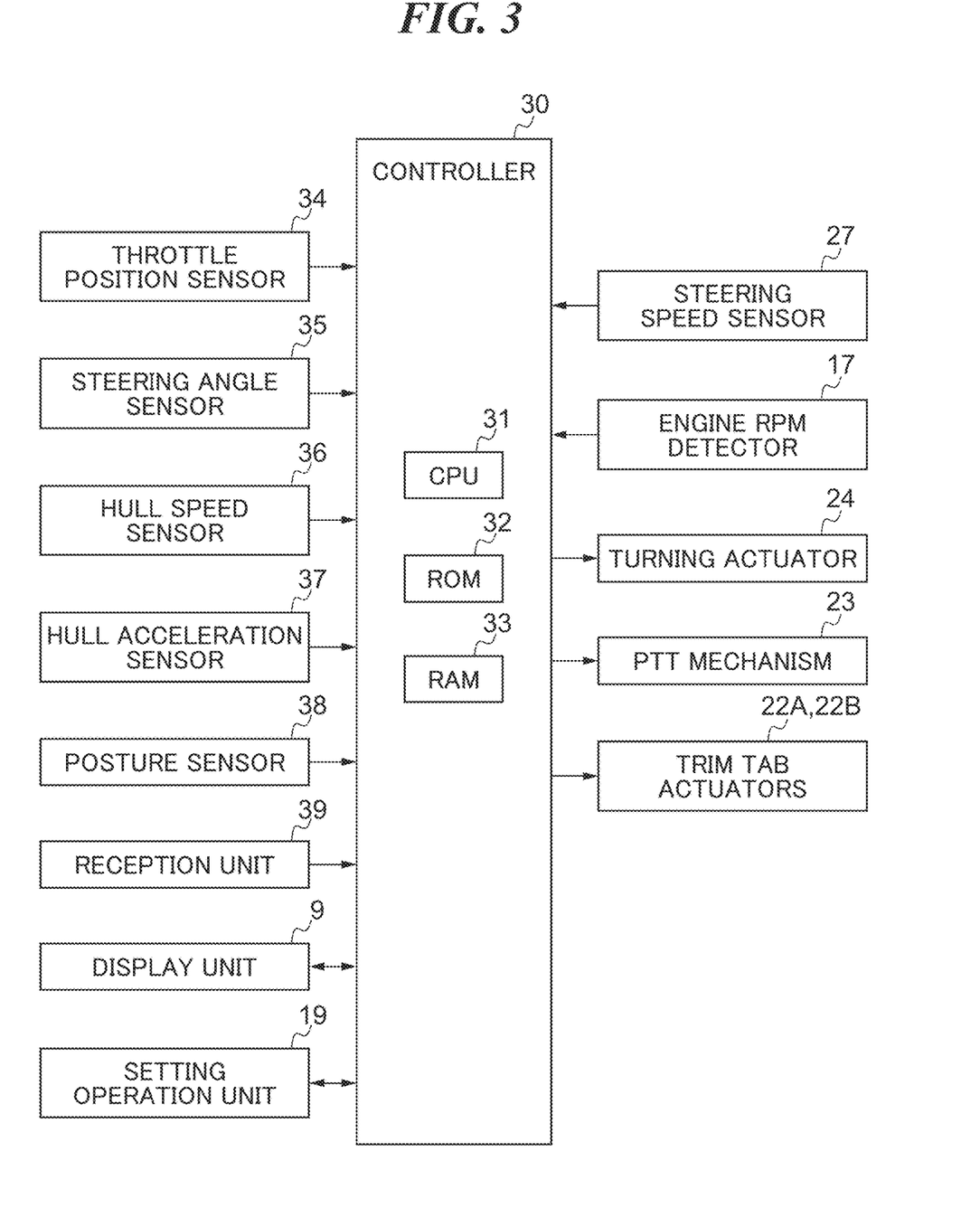
FIG. 3 is a block diagram of a maneuvering system.

FIG. 3 is a block diagram of a maneuvering system. The maneuvering system includes a control system for posture control tabs according to the first preferred embodiment. The marine vessel 11 includes a controller 30, a throttle position sensor 34, a steering angle sensor 35, a hull speed sensor 36, a hull acceleration sensor 37, a posture sensor 38, a reception unit 39, a display unit 9, and a setting operation unit 19. The marine vessel 11 also includes an engine rpm detector 17, a turning actuator 24, the PTT mechanism 23, and the trim tab actuators 22A and 22B (see FIG. 2 as well). The marine vessel 11 further includes a steering speed sensor 27.

The controller 30, the steering angle sensor 35, the hull speed sensor 36, the hull acceleration sensor 37, the posture sensor 38, the reception unit 39, the display unit 9, the setting operation unit 19, and the steering speed sensor 27 are included in the central unit 10 or disposed in the vicinity of the central unit 10. The turning actuator 24 and the PTT mechanism 23 are provided for the outboard motor 15. The throttle position sensor 34 and the engine rpm detector 17 are provided in the outboard motor 15. The trim tab actuators 22A and 22B are included in the trim tab units 20A and 20B, respectively. The steering speed sensor 27 detects the operation speed of the steering wheel 18, i.e., the steering speed.

The controller 30 includes a CPU 31, a ROM 32, a RAM 33, and a timer which is not illustrated. The ROM 32 stores a control program. The CPU 31 loads the control program stored in the ROM 32 into the RAM 33 to implement various types of control processes. The RAM 33 provides a work area for the CPU 31 to execute the control program.

Results of detection by the sensors 27 and 34 to 38 and the engine rpm detector 17 are supplied to the controller 30. The throttle position sensor 34 detects the opening angle of a throttle valve, which is not illustrated. The steering angle sensor 35 detects the turning angle of the steering wheel 18 that has turned. The hull speed sensor 36 and the hull acceleration sensor 37 detect the speed (vessel speed) and the acceleration, respectively, of the marine vessel 11 (the hull 13) while it is traveling.

The posture sensor 38 includes, for example, a gyro sensor, a magnetic direction sensor, and so forth. Based on a signal output from the posture sensor 38, the controller 30 calculates a roll angle, a pitch angle, and a yaw angle. It should be noted that the controller 30 may calculate the roll angle and the pitch angle based on a signal output from the hull acceleration sensor 37. The reception unit 39 includes a GNSS (Global Navigation Satellite Systems) receiver such as a GPS and includes a function of receiving GPS signals and various types of signals as positional information. Signals received by the reception unit 39 are supplied to the CPU 31. Here, from a speed restricted area or ground in the vicinity of the marine vessel 11, an identification signal providing a notification that the area is a speed restricted area is transmitted. The speed restricted area refers to an area in a harbor or the like in which it is required to limit the speed of a marine vessel to a predetermined speed or lower. The reception unit 39 also includes a function of receiving the identification signal. It should be noted that the acceleration of the hull 13 may also be obtained from a GPS signal received by the reception unit 39.

The engine rpm detector 17 detects the number of revolutions of the engine 16 per unit time (hereafter referred to as "the engine rpm" or "N"). The display unit 9 displays various types of information. The setting operation unit 19 includes an operator that a vessel operator uses to perform operations relating to maneuvering, a PTT operation switch, a setting operator that a vessel operator uses to make various settings, and an input operator that a vessel operator uses to input various types of instructions (none of which are illustrated).

The turning actuator 42 turns the outboard motor 15 about the turning center C2 with respect to the hull 13. Turning the outboard motor 15 about the turning center C2 changes the direction in which a propulsive force acts on the centerline C1 of the hull 13. The PTT mechanism 23 tilts the outboard motor 15 with respect to the clamp bracket by turning the outboard motor 15 about the tilt shaft. The PTT mechanism 23 is operated in response to, for example, operation of the PTT operation switch. As a result, the inclination angle (trim angle or tilt angle) of the outboard motor 15 with respect to the hull 13 is changed.

The trim tab actuator 22A (port side actuator) and the trim tab actuator 22B (starboard side actuator) are controlled by the controller 30. For example, the trim tab actuators 22A and 22B operate in response to the controller 30 outputting control signals to them. In response to the operation of one of the trim tab actuators 22A and 22B, the corresponding one of tabs 21A and 21B swings. It should be noted that actuators used for the PTT mechanism 23 or the trim tab actuators 22A and 22B may be either hydraulic or electric.

It should be noted that the controller 30 may obtain results of detection by the engine rpm detector 17 via a remote control ECU, which is not illustrated. The controller 30 may also use an outboard motor ECU (not illustrated) provided in the outboard motors 15 to control the engine 16.

Signals output by the posture sensor 38 are used also to detect the turning state of the hull 13. The signals output from the posture sensor 38 includes a yaw rate (yaw angular-velocity) around the yaw axis. The CPU 31 uses the yaw rate output from the posture sensor 38 to determine whether or not the travel direction of the hull 13 is straight. The CPU 31 determines that the travel direction of the hull 13 is straight if the yaw rate is equal to or less than a predetermined value, and determines that the travel direction of the hull 13 is turning if the yaw rate exceeds the predetermined value. It should be noted that the CPU 31 may determine whether or not the traveling direction of the hull 13 has changed based on the time series data of the yaw angle acquired from the magnetic direction sensor in the posture sensor 38. It should be noted that in the first preferred embodiment, it is not essential to detect the turning state.

In the first preferred embodiment, the steering wheel 18 is used as an example of a steering control that provides instructions to control a direction in which a hull moves. A description is provided of an outline of the trim tab control process (FIG. 4) here, and a detailed description will be given of the trim tab control process below.

In response to a steering operation of the steering wheel 18, which instructs a change in movement of the hull 13, the CPU 31 assists the steering operation by controlling the trim tab units 20A and 20B. First, the CPU 31 acquires the trim position of the outboard motor 15. The trim position is an inclination angle of the outboard motor 15 relative to the clamp bracket. The trim position changes due to the operation of the PTT mechanism 23 based on the command from the CPU 31, and the CPU 31 constantly determines the trim position from the command content.

On the other hand, the "actual trim angle" is a substantial trim angle reflecting the pitch angle of the hull 13, and is defined as follows. The CPU 31 estimates the axis line of the propeller shaft based on the trim position obtained from the command and the pitch angle of the hull 13. Then, the CPU 31 determines the angle defined by the estimated axial line of the propeller shaft with the horizon in the rear of the hull as the actual trim angle.

A description is now provided of an outline of the trim tab control process (FIG. 4) which will be described in detail. When a steering instruction provided by the steering wheel 18 is acquired, the CPU 31 determines a posture control tab to be actuated among the tabs 21A and 21B based on the trim position of the outboard motor 15, and controls one of the trim tab actuators 22A and 22B corresponding to the determined posture control tab so as to change the position of the determined posture control tab (first control). At this time, the CPU 31 determines, based on the trim position of the outboard motor 15 and the pitch angle of the hull 13, an operation direction of the steering wheel 18 in which an operation force necessary to operate the steering wheel 18 becomes large, e.g., becomes larger than a predetermined force, among the direction of right turning of the hull 13 and the direction of left turning of the hull 13. In order to determine the operation direction in which the operation force becomes large, the CPU 31 compares the actual trim angle with the "reference angle". This is because the operation direction in which the operation force becomes large changes depending on the actual trim angle. In the first preferred embodiment, the term "operation force" is referred to as the weight of the steering wheel 18 felt by the driver operating the steering wheel 18. Strictly speaking, the actuation of the tabs 21A and 21B does not necessarily change the operation force, but is able to reduce the operation amount of the steering wheel 18 necessary for the desired change in movement of the hull 13, thus reducing the sensory burden on the driver as a result. In the first preferred embodiment, a reduction of the driver's sensory burden has the same meaning as a reduction of the operation force.

As an example, the reference angle is determined in advance as a fixed value. First, a description is provided of the method of determining the reference angle and the relationship between the actual trim angle of the outboard motor 15 and the weight of the steering.

In a state in which the trim angle of the outboard motor 15 is in a horizontal position with respect to the water flow, the propeller angles on the left and right typically become the same with respect to the water flow, and the weights of steering on the left and right become the same with the exception of the paddle wheel effect. Accordingly, depending on the pitch angle of the hull 13, the trim position at which the weights of the steering become equal on the left and right changes.

In view of the paddle wheel effect, the trim position at which the weights of the steering become equal on the left and right becomes a position where the outboard motor 15 is trimmed down from the horizon. The paddle wheel effect changes depending on the vessel speed, the propeller pitch, and the propeller rotation speed. In the paddle wheel effect, a force that moves the stern to the right acts, and thus a force that turns the hull 13 to the left acts.

However, when the outboard motor 15 is trimmed down, the left side of the propeller works relatively more than the right side of the propeller, and thus the reaction force of the rotating propeller generates a force that turns the hull to the right. Accordingly, an effect of the outboard motor 15 trimmed down to a certain position balances the paddle wheel effect. This balanced position is a trim position in which the weights of the steering become equal on the left and right.

It should be noted that in a case in which the weights of the steering on the right and left are different, the difference in the weight changes depending on the difference in the amount of water propelled by the propeller on the right and left. The degree to which the weight difference changes depends on the vessel speed, the propeller pitch, and the propeller rotation speed, in addition to the trim position and the pitch of the hull 13. Accordingly, the trim position at which the weights of the steering become equal on the left and right is determined based on these elements.

In the first preferred embodiment, a fixed reference angle is determined in advance based on the propeller pitch in consideration of the above elements and the paddle wheel effect. The reference angle is stored in the ROM 32. It should be noted that when used, the reference angle may be corrected based on at least one of the vessel speed and the propeller rotation speed.

In the first preferred embodiment, if the actual trim angle is in the down direction relative to the reference angle, it is determined that the steering operation that causes the left turning of the hull 13 needs a greater force. If the actual trim angle is in the up direction relative to the reference angle, it is determined that the right turning of the hull 13 needs a greater force. If a steering operation is performed through the steering wheel 18 in a direction in which the operation force becomes large, the trim tab units 20A and 20B are controlled to assist turning of the hull 13.

Figure 4:
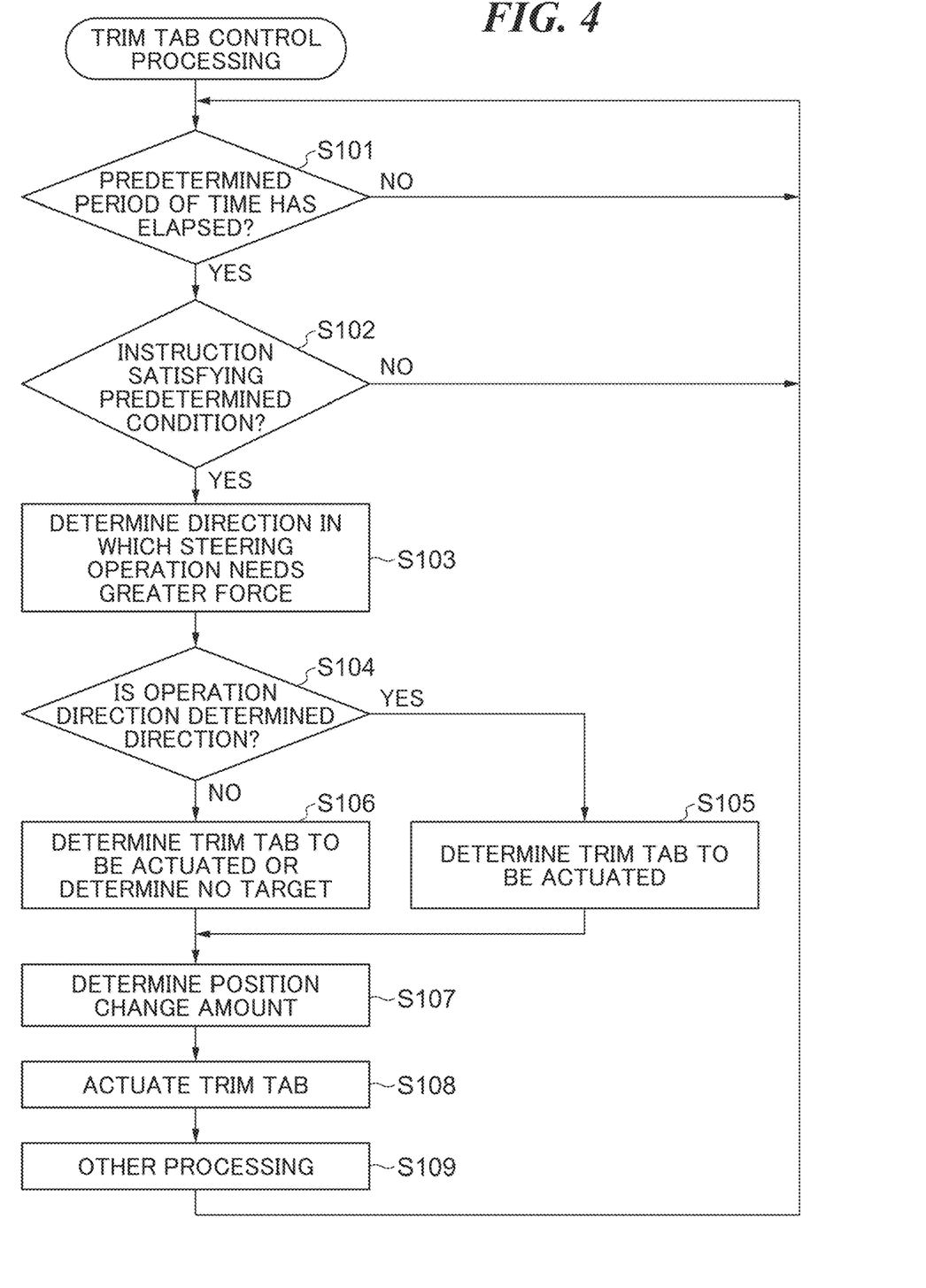
FIG. 4 is a flowchart of a trim tab control process.

FIG. 4 is a flowchart of the trim tab control process. This process is implemented by the CPU 31 loading and executing, in the RAM 33, the control program stored in the ROM 32. This process is started, for example, when the vessel maneuvering system is activated. In this process, the CPU 31 defines and functions as an instruction acquisition unit that acquires a steering instruction provided through the steering wheel 18, a trim position acquisition unit that acquires the trim position of the outboard motor 15, and a processor according to a preferred embodiment of the present invention.

In step S101, the CPU 31 waits for a predetermined period of time (for example, between about 100 ms and about 1 sec) to elapse. After the predetermined period of time has elapsed, the CPU 31 determines in step S102 whether or not an instruction to control the direction in which the hull 13 moves (steering instruction), provided through the steering wheel 18, satisfying a predetermined condition has been acquired. The predetermined condition mentioned here is satisfied when at least one of a first condition and a second condition described below is satisfied.

The first condition is that the operation amount from the neutral position of the steering wheel 18 is larger than a predetermined amount. The operation amount is acquired from a change in the output signal of the steering angle sensor 35, for example. The second condition is that the speed of a steering operation of the steering wheel 18 is higher than a predetermined operation speed. By using the predetermined conditions, the posture control of the hull 13 is stabilized by preventing the reaction from becoming hypersensitive. The operation speed of the steering wheel 18 is acquired from the output signal of the steering speed sensor 27. It should be noted that the operation speed may be acquired from a change in the output signal of the steering angle sensor 35 within the predetermined period of time. Alternatively, instead of the speed of the steering operation, the second condition may be that the acceleration of the steering operation is acquired from the output signal of the steering speed sensor 27 and this acceleration is larger than a predetermined acceleration. It should be noted that the determination as to whether or not a steering instruction has been obtained is performed not only during straight travel of the hull 13 but also during turning of the hull 13 at a constant steering angle.

After the determination in step S102, the CPU 31 returns the process to step S101 if a steering instruction provided by the steering wheel 18 satisfying the predetermined condition is not acquired. If a steering instruction provided by the steering wheel 18 satisfying the predetermined condition is acquired, the CPU 31 proceeds with the process to step S103.

In step S103, the CPU 31 determines, based on the trim position of the outboard motor 15 and the pitch angle of the hull 13, the operation direction of the steering wheel 18 in which an operation force necessary to operate the steering wheel 18 becomes large, among the direction of right turning of the hull 13 and the direction of left turning of the hull 13. That is, the CPU 31 determines the direction in which the operation of the steering wheel 18 needs a greater force or the steering wheel 18 becomes heavy. As described above, the pitch angle is acquired from the output signal of the posture sensor 38. The CPU 31 obtains the actual trim angle based on the trim position and the pitch angle, and determines that the heavy direction (operation direction in which the operation force necessary to operate the steering wheel 18 becomes large) is the left direction if the actual trim angle is in the down direction relative to the reference angle, or determines that the heavy direction is the right direction if the actual trim angle is in the up direction relative to the reference angle. It should be noted that in order to simplify the process, the CPU 31 may determine the operation direction in which the necessary operation force becomes large based on the trim position.

In step S104, the CPU 31 determines whether or not the direction of the current operation of the steering wheel 18 (direction of a change in movement of the hull 13 instructed by the steering instruction provided by the steering wheel 18) is the heavy direction. That is, the CPU 31 determines whether or not the direction of a change in movement of the hull 13 instructed by the steering instruction agrees with the determined operation in which an operation force necessary to operate the steering wheel 18 becomes large. Then, the CPU 31 proceeds with the process to step S105 if the current operation direction of the steering wheel 18 agrees with the heavy direction, and the CPU 31 proceeds with the process to step S106 if the current operation direction of the steering wheel 18 does not agree with the heavy direction.

In step S105, the CPU 31 determines a trim tab unit that is able to assist the steering operation by being moved down, among the trim tab units 20A and 20B. Specifically, the CPU 31 first determines one of the tabs 21A and 21B located on the same side as the current operation direction of the steering wheel 18 (or the heavy direction), as the tab to be actuated (in this case, the tab to be actuated downward). For example, if the current operation direction of the steering wheel 18 is the right and the heavy direction is the right, the tab 21B located on the right side is determined as the tab to be actuated. It should be noted that it is not essential that both the tabs 21A and 21B are in the retracted position at the time of determining the tab to be actuated.

After step S105, the CPU 31 determines in step S107 a position change amount Δ2, or the actuation amount of the tab determined to be actuated. In this case, the larger a difference D1 between the actual trim angle and the reference angle, the more the CPU 31 increases the change amount Δ2. In addition, the larger a vessel speed V acquired from the hull speed sensor 36 is, the more the CPU 31 reduces the position change amount Δ2. Accordingly, the CPU 31 calculates a tentative position change amount Δ1 from the following expression (1). Coefficients K1 and K2 are appropriately determined.

$$\text{Tentative position change amount } \Delta 1 = \text{Difference } D1 \times \text{Coefficient } K1 - \text{Vessel speed } V \times \text{Coefficient } K2 \qquad (1)$$

Next, the CPU 31 calculates the position change amount Δ2 by correcting the calculated tentative position change amount Δ1 by a pitch angle P, from the following expression (2). It should be noted that a positive value of each change amount means that the tab is to be moved downward.

$$\text{Position change amount } \Delta 2 = \text{Tentative change amount } \Delta 1 - P \qquad (2)$$

According to the expression (2), the larger the pitch angle P is, the smaller the CPU 31 corrects the position change amount Δ2. This is because the substantial angle of the tabs 21A and 21B with respect to the horizontal plane changes depending on the pitch angle P. It should be noted that in the expression (1), the number of revolutions of the engine 16 (engine rotation speed N) may be used instead of the vessel speed V. In a case in which the expression (1) is calculated by using the engine rotation speed N, the coefficient K2 may be a variable. This is because the difference in the amount of water propelled by the tabs 21A and 21B respectively located on the left side and the right side changes the difference in an operation force necessary to operate the steering wheel 18 between the left-hand side and the right-hand side. Accordingly, the coefficient K2 in the case in which the engine rotation speed N is used in the calculation may be a positive value or may be a negative value. The coefficient K2 is determined by various parameters (relative position relationship of the left and right tabs 21A and 21B and the like), for example. In addition, the CPU 31 may calculate the position change amount Δ2 using the expression (2) in consideration with the propeller pitch. For example, the larger the propeller pitch is, the smaller the CPU 31 may correct the position change amount Δ2 so as to be.

In step S108 after passing through step S105, the CPU 31 controls one of the trim tab actuators 22A and 22B corresponding to the tab determined to be actuated in step 105 among the tabs 21A and 21B to actuate (move downward) the determined tab by the position change amount Δ2. This reduces the operation force necessary to operate the steering wheel 18 in the current operation direction. For example, in a case in which the current operation direction of the steering wheel 18 is the right and the heavy direction is also the right, the right tab 21B is determined as the tab to be actuated and then is actuated downward. The actuated tab 21B generates resistance against the water, and thus a force to make the hull 13 to turn in the right direction acts on the hull 13. As a result, the vessel driver feels that the operation force necessary to operate the steering wheel 18 to make the hull 13 turn in the right becomes small.

Next, in step S109, the CPU 31 executes "other processing". In other processing, for example, a process corresponding to setting or operation in the setting operation unit 19 is executed. In addition, with termination of the vessel maneuvering system, a process of terminating the process of the flowchart is executed. In addition, in other processing, setting and cancellation of various modes are also executed. Thereafter, the CPU 31 returns the process to step S101.

In step S106, the CPU 31 determines a tab to be actuated or determines that there is no tab to be actuated. In a case in which the process proceeds from step S104 to step S106, the current operation direction of the steering wheel 18 is the direction in which the operation force necessary to operate the steering wheel 18 becomes small, and thus it is not necessary to assist the steering operation of the steering wheel 18. Therefore, first, if both the tabs 21A and 21B are in the retracted position, the CPU 31 determines that there is no tab to be actuated. If one of the tabs 21A and 21B that is located on the opposite side (non-operation side) to the current operation direction of the steering wheel 18 has lowered, the CPU 31 determines the one of the tabs 21A and 21B located on the non-operation side as the tab to be actuated (in this case, the tab to be actuated upward). This returns upward one of the tabs 21A and 21B that has been actuated downward in the process of steps S105 to S108 in response to reversal of the operation direction.

In step S107 via step S106, the CPU 31 determines the position change amount Δ2, which is the actuation amount of one of the tabs 21A and 21B determined to be actuated. At that time, the CPU 31 calculates the position change amount Δ2 in the upward direction by using a similar method to that used for the position change amount Δ2 in the downward direction calculated by the expressions (1) and (2). In step S108 in this case, the tab moves up by the position change amount Δ2. If it is determined in step S106 that there is no tab to be actuated, the position change amount Δ2 is determined to be zero in step S107, and neither of the tabs 21A and 21B is substantially actuated in step S108.

It should be noted that in step S106, as a special case, it is conceivable a case in which one of the tabs 21A and 21B located on the same side as the current operation direction of the steering wheel 18 has been positioned down. This corresponds to such a case in which the actual trim angle changes abruptly while the operation of the steering wheel 18 is continued in the heavy direction and it abruptly reverses the direction in which the operation force necessary to operate the steering wheel 18 becomes large, for example. In such a case, the CPU 31 may determine one of the tabs 21A and 21B located on the same side as the current operation direction as the tab to be actuated (in this case, tab to be actuated upward). In this case, the tab determined to be actuated is actuated to the retracted position.

In addition, in step S105, as a special case, it is conceivable a case in which one of the tabs 21A and 21B located on the non-operation side has been positioned down. This is such a case in which the actual trim angle changes abruptly almost simultaneously with the switching of the operation direction of the steering wheel 18 and it abruptly reverses the direction in which the operation force necessary to operate the steering wheel 18 becomes large, for example. In such a case, the CPU 31 may determine one of the tabs 21A and 21B located on the non-operation side as the tab to be actuated upward. Alternatively, the CPU 31 may determine one of the tabs 21A and 21B located on the same side as the operation direction of the steering wheel 18 as the tab to be actuated downward, and further determine the tab located on the non-operation side as the tab to be actuated upward. The position change amounts for the upward actuation and the downward actuation in this case may be determined such that the sum of the absolute value of the position change amount for the upward actuation and the absolute value of the position change amount for the downward actuation matches the position change amount Δ2 (which are by prorated with an appropriate ratio).

It should be noted that in step S105, the CPU 31 may determine the tab to be actuated only when the difference in operation force necessary to operate the steering wheel 18 between the left side and the right side is equal to or greater than a predetermined value.

According to the first preferred embodiment, when a steering instruction is acquired, the CPU 31 determines a tab to be actuated among the tabs 21A and 21B based on the trim position of the outboard motor 15 (or the trim position of the outboard motor 15 and the pitch angle of the hull 13), and controls one of the trim tab actuators 22A and 22B corresponding to the determined tab so as to change the position of the determined tab. This allows the steering operation of the steering wheel 18 to be assisted where necessary. The CPU 31 preferably determines, based on the trim position of the outboard motor 15 and the pitch angle of the hull 13, an operation direction of the steering wheel 18 in which the operation force necessary to operate the steering wheel 18 becomes large, among the direction of right turning of the hull 13 and the direction of left turning of the hull 13, and in a case in which the direction of the steering operation (the direction of a change in movement of the hull 13 instructed by the steering instruction) agrees with the determined operation direction, determines one of the tabs 21A and 21B located on the same side as the determined operation direction as the tab to be actuated downward (S105). Due to this, when the steering wheel 18 is operated to turn in the determined direction (heavy direction), the tab located on the same side as the heavy direction moves downward, and thus the operation force necessary to operate the steering wheel 18 becomes small.

In addition, the position change amount Δ2 is determined based on the trim position, either the speed V of the hull 13 or the engine rotation speed N, and the pitch angle P, and it is thus possible to assist the steering operation of an appropriate degree.

In addition, in a case in which the direction of the steering operation (the direction of a change in movement of the hull 13 instructed by the steering instruction) does not agree with the heavy direction and one of the tabs 21A and 21B located on the opposite side to the current operation direction (the non-operation direction that is opposite to the direction of the change in movement of the hull 13 instructed by the steering instruction), is positioned down, the CPU 31 determines the tab on the non-operation side as the tab to be actuated upward (S106). In this case, in response to reversal of the operation direction of the steering wheel 18, one of the tabs 21A and 21B that has been positioned down for assisting the steering operation of the steering wheel 18, returns upward, and it reduces the resistance to the current steering operation.

In addition, the process in and after step S103 is executed when the predetermined condition is satisfied (when at least one of the first condition and the second condition holds), and thus the posture control of the hull 13 is stabilized by preventing the reaction from becoming hypersensitive to a minute operation of the steering wheel 18.

Second Preferred Embodiment

Next, a description is provided of the second preferred embodiment. The second preferred embodiment is different from the first preferred embodiment in the trim tab control process, and the other configurations are the same.

Figure 5:
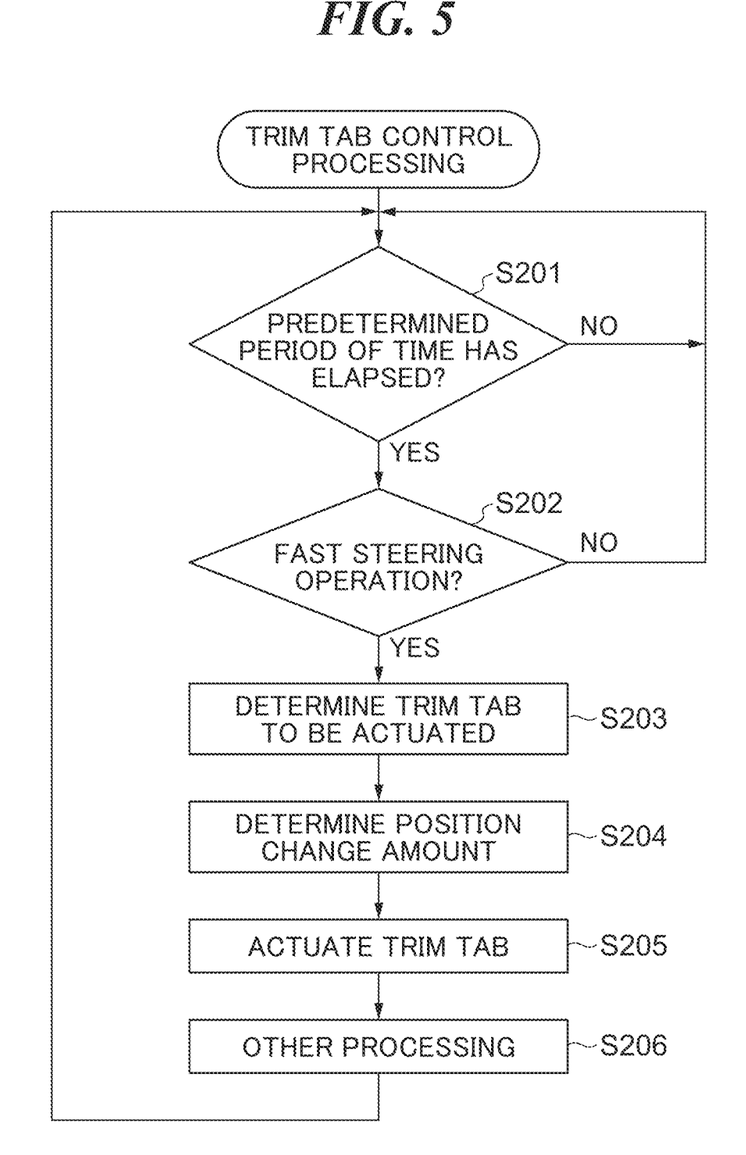
FIG. 5 is a flowchart of a trim tab control process.

FIG. 5 is a flowchart of the trim tab control process. The execution subject and the start condition of this process are the same as those of the trim tab control process shown in FIG. 4. In step S201, the CPU 31 waits for a predetermined period of time to elapse, as in step S101. After the predetermined period of time has elapsed, the CPU 31 determines in step S202 whether or not a fast steering operation has been performed (in other words, whether or not a steering instruction provided by the steering wheel 18 at a fast operation speed has been acquired). Here, it is determined that a fast steering operation has been performed if the speed of the steering operation of the steering wheel 18 is higher than a predetermined operation speed. This is the same as the determination as to whether or not the second condition is satisfied in step S102. Due to this, the posture control of the hull 13 is stabilized by preventing the reaction from becoming hypersensitive.

As a result of the determination in step S202, the CPU 31 returns the process to step S201 if a fast steering operation has not been performed, and proceeds with the process to step S203 if a fast steering operation has been performed. In step S203, the CPU 31 determines one of the tabs 21A and 21B located on the same side as the current operation of the steering wheel 18 as the tab to be actuated (in this case, the tab to be actuated downward). For example, when the direction of the current operation of the steering wheel 18 is the right, the tab 21B located on the right side is determined to be actuated. It should be noted that it is not essential that both the tabs 21A and 21B are in the retracted position at the time of determining the tab to be actuated.

In step S204, the CPU 31 determines the position change amount Δ2, which is an actuation amount of the tab to be actuated. In this case, the larger an operation speed stV of the steering wheel 18 acquired from the steering speed sensor 27 is, the more the CPU 31 increases the position change amount Δ2. In addition, the larger the vessel speed V or the engine rotation speed N is, the more the CPU 31 reduces the position change amount Δ2. Accordingly, the CPU 31 calculates the tentative position change amount Δ1 by the following expression (3). A coefficient K3 is appropriately determined.

$$\text{Tentative position change amount } \Delta1 = \text{Operation speed } stV \times \text{Coefficient } K3 - \text{Vessel speed } V \times \text{Coefficient } K2 \quad (3)$$

Next, similarly to the calculation method in step S107, the CPU 31 calculates the position change amount Δ2 by correcting the calculated tentative position change amount Δ1 by the pitch angle P, from the expression (2). This is because the substantial angle of the tabs 21A and 21B with respect to the horizontal plane changes depending on the pitch angle P. It should be noted that in the expression (2), the CPU 31 may calculate the position change amount Δ2 in consideration of the propeller pitch. For example, the larger the propeller pitch is, the smaller the CPU 31 may correct the position change amount Δ2 so as to be. It should be noted that in the expression (3), the engine rotation speed N may be used instead of the vessel speed V. It should be noted that a positive value of each change amount means that the tab is to be moved downward.

Next, in step S205, the CPU 31 controls one of the trim tab actuators 22A and 22B corresponding to the tab determined to be actuated in step 203 among the tabs 21A and 21B to actuate (move downward) the determined tab by the position change amount Δ2. Due to this, one of the tabs 21A and 21B located on the same side as the steering direction is moved down, and thus the hull 13 is easily oriented in the steering direction to assist the steering operation of the steering wheel 18. In step S206, the CPU 31 executes other processing similar to that in step S109 of FIG. 4, and the flow of the process returns to step S201.

It should be noted that in step S203, as a special case, it is conceivable a case in which one of the tabs 21A and 21B located on the non-operation side of the steering wheel 18 has been positioned down. This corresponds to a case in which the steering is suddenly performed in the opposite direction immediately after the sudden steering, for example. In such a case, the CPU 31 may determine one the tabs 21A and 21B located on the non-operation side as the target to be actuated upward. Alternatively, the CPU 31 may determine one of the tabs 21A and 21B located on the same side as the operation direction of the steering wheel 18 as the target to be actuated downward, and further determine the tab located on the non-operation side as the target to be actuated upward. The position change amounts for the upward actuation and the downward actuation in this case may be determined such that the sum of the absolute value of the position change amount for the upward actuation and the absolute value of the position change amount for the downward actuation matches the position change amount Δ2 (which are prorated with an appropriate ratio).

According to the second preferred embodiment, when an instruction is provided by the steering wheel 18 at a faster operation speed than a predetermined operation speed, the CPU 31 determines the tab to be actuated among the tabs 21A and 21B based on the direction of a change in movement of the hull 13 instructed by the steering instruction, and controls one of the trim tab actuators 22A and 22B corresponding to the determined tab so as to change the position of the determined tab (first control). This allows the steering operation of the steering wheel 18 to be assisted when necessary. In addition, the posture control of the hull 13 is stabilized by preventing the reaction from becoming hypersensitive to a minute operation of the steering wheel 18. The CPU 31 preferably determines one of the tabs 21A and 21B located on the same side as the direction of a change in movement of the hull 13 instructed by the steering instruction as the tab to be actuated downward, and controls one of the trim tab actuators 22A and 22B corresponding to the determined tab so as to move the determined tab downward. In accordance with the driver's intention to change the course quickly, the tabs 21A and 21B assist the steering operation of the steering wheel 18, and thus the operation force necessary to operate the steering wheel 18 becomes small.

In addition, the position change amount Δ2 is determined based on the operation speed stV, either the speed V of the hull 13 or the engine rotation speed N, and the pitch angle P, and it is thus possible to assist the steering operation at an appropriate degree.

From the point of view of simplifying the process, in the first and second preferred embodiments, the position change amount Δ2 calculated in steps S107 and S204 may be a predetermined fixed amount.

It should be noted that in the first and second preferred embodiments, a correction mode described below may be incorporated in the trim tab control process (FIG. 4 and FIG. 5). That is, even during execution of the correction mode, the CPU 31 may execute the first control of changing the positions of the tabs 21A and 21B in response to acquisition of a steering instruction (or acquisition of a steering instruction provided by the steering wheel 18 at a faster operation speed than a predetermined operation speed). First, a description is given of an example in which the correction mode is executed in the first preferred embodiment.

Figure 6:
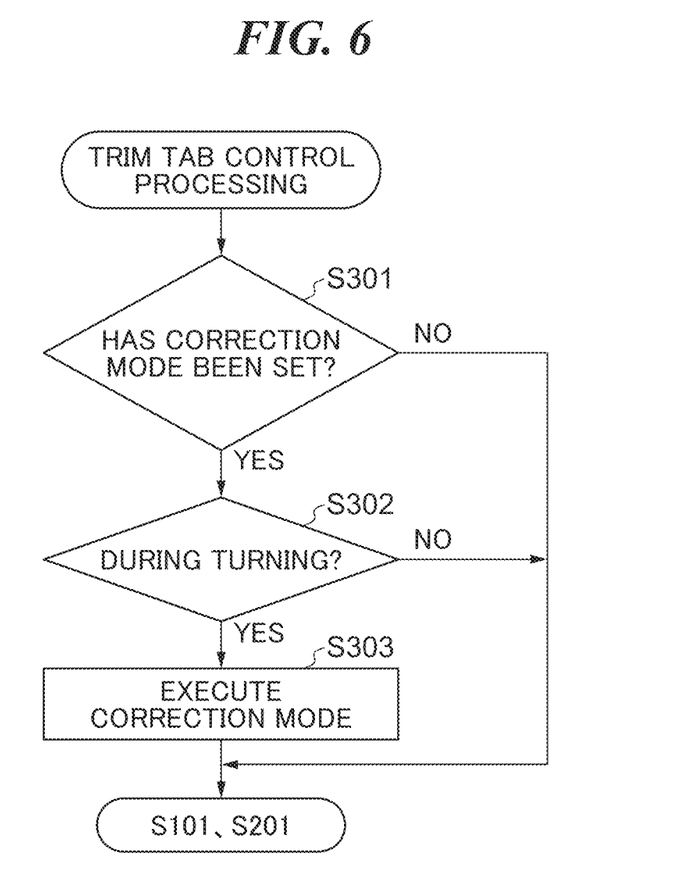
FIG. 6 is a portion of a flowchart of a trim tab control process.

FIG. 6 is a portion of a flowchart of the trim tab control process. The process of steps S301 to S303 is executed immediately before step S101 of FIG. 4, for example. In step S301, the CPU 31 determines whether or not the correction mode has been set. The correction mode is a mode in which, when the roll angle exceeds a certain angle during turning of the hull 13, the CPU 31 performs roll correction so that the roll angle approaches the certain angle, in which the certain angle is defined by the direction of the resultant force of the centrifugal force and gravity with a direction of gravity. That is, the CPU 31 controls the trim tab actuators 21A and 22B to actuate the tabs 21A and 22B so as to make the roll angle approach the certain angle (second control). The CPU 31, defining and functioning as a roll angle acquisition unit, acquires the roll angle from an output signal of the posture sensor 38. The correction mode is set by an operation of the setting operation unit 19 by the user, for example.

As a result of the determination in step S301, the CPU 31 proceeds with the process to step S101 of FIG. 4 if the correction mode has not been set. On the other hand, if the correction mode has been set, the CPU 31 determines whether or not the hull 13 is in the middle of turning based on the output signal of the posture sensor 38. Then, the CPU 31 proceeds with the process to step S101 if the hull 13 is not in the middle of turning. On the other hand, if the hull 13 is in the middle of turning, the correction mode is executed in step S303. That is, when the roll angle exceeds the angle defined by the direction of the resultant force of the centrifugal force and gravity with the direction of gravity, the trim tab actuators 22A and 22B are controlled so as to actuate the tabs 21A and 21B so that the roll angle approaches the certain angle.

An example of the roll correction will be described with an example of a control of moving the tab 21A or the tab 21B up. The CPU 31 controls the trim tab actuators 22A and 22B based on the roll angle, either the speed V of the hull 13 or the engine rotation speed N, and the pitch angle P. Let the difference between the roll angle and the angle defined by the direction of the resultant force of the centrifugal force and gravity with a direction of gravity be D2. The CPU 31 calculates a tentative correction amount RC1 from the following expression (4). Coefficients K4 and K5 are appropriately determined.

$$\text{Tentative correction amount } RC1 = \text{Difference } D2 \times \text{Coefficient } K4 - \text{Vessel speed } V \times \text{Coefficient } K5 \quad (4)$$

Next, the CPU 31 calculates a correction amount RC2 by correcting the calculated tentative correction amount RC1 by the pitch angle P, from the following expression (5). It should be noted that a positive value of each correction amount means that the tab is to be moved downward.

$$\text{Correction amount } RC2 = \text{Tentative correction amount } RC1 - P \quad (5)$$

This is because the substantial angle of the tabs 21A and 21B with respect to the horizontal plane changes depending on the pitch angle P. It should be noted that in the expression (4), the engine rotation speed N may be used instead of the vessel speed V.

After step S303, the CPU 31 proceeds with the process to step S101 of FIG. 4. In the subsequent step S107, the CPU 31 determines a value obtained by adding the correction amount RC2 calculated in step S303 to the change amount Δ2 calculated in the expression (2), as the position change amount Δ2 to be used in step S108. Accordingly, as for actuation of the tabs 21A and 21B, if there is an operation of the steering wheel 18 satisfying the predetermined condition, the actuation based on the operation and the actuation by the correction mode are performed in parallel. In addition, if there is no operation of the steering wheel 18 during turning of the hull 13, the correction mode is independently performed.

According to the second preferred embodiment, even during execution of the correction mode, the CPU 31 executes the first control in which the position of a tab to be actuated among the tabs 21A and 21B are changed in response to a steering operation. This allows the steering operation of the steering wheel 18 to be assisted even during execution of the roll correction at the time of turning of the hull 13.

It should be noted that the correction mode may be executed in the second preferred embodiment. In this case, the process of steps S301 to S303 is executed immediately before step S201 of FIG. 5, for example. Accordingly, as for actuation of the tabs 21A and 21B, if there is a fast steering operation, the actuation based on the operation and the actuation by the correction mode are performed in parallel. In addition, if there is no fast steering operation during turning of the hull 13, the correction mode is independently executed. This allows the fast steering operation of the steering wheel 18 to be assisted even during execution of the roll correction at the time of turning of the hull 13.

Third Preferred Embodiment

Next, a description is provided of the third preferred embodiment. The third preferred embodiment is different from the first preferred embodiment in that instead of the trim tab control process, a steering control including the trim tab control is executed, and the other configurations are the same.

Figure 7:
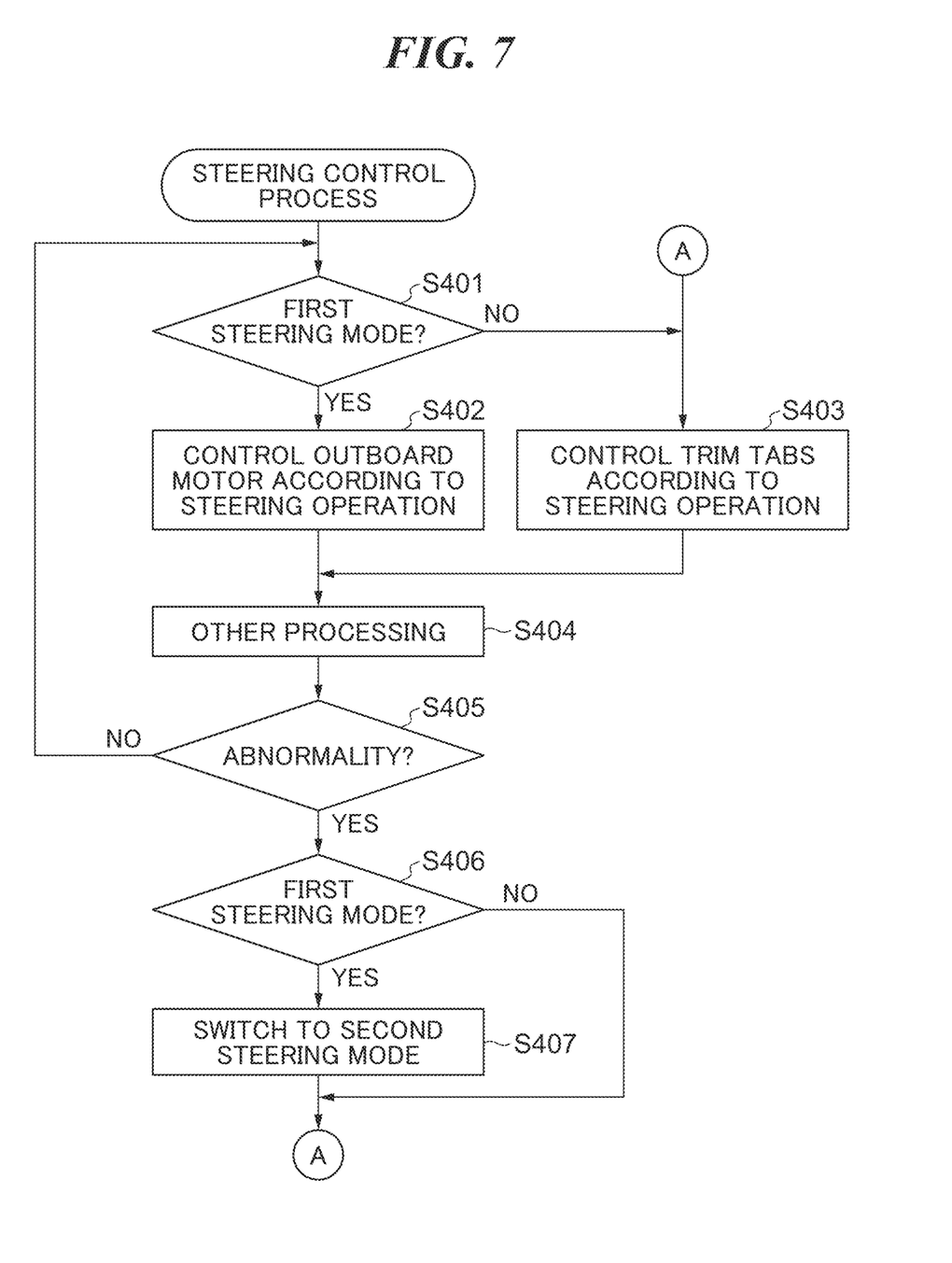
FIG. 7 is a flowchart of a steering control process.

FIG. 7 is a flowchart of the steering control process. The execution subject and the start condition of this process are the same as those of the trim tab control process shown in FIG. 4. The third preferred embodiment includes a first mode and a second mode as a steering mode of the hull 13. The first mode is a normal steering mode in which the outboard motor 15 is controlled (to rotate about the rotation center C2) according to a steering instruction. The second mode is an emergency steering mode in which the trim tab actuators 22A and 22B are controlled according to a steering instruction. The steering mode is set by an operation of the setting operation unit 19 by the user, for example. By using the fact that the travel direction of the hull 13 changes when any one of the tabs 21A and 21B moves down, the CPU 31 controls, in the second mode, the direction in which the hull 13 moves by the control of the tabs 21A and 21B without controlling the outboard motor 15 to steer.

First, in step S401, the CPU 31 determines whether or not the first mode has been set. Then, the CPU 31 proceeds with the process to step S402 if the first mode has been set, and proceeds with the process to step S403 if the first mode has not been set because the second mode has been set.

In step S402, the CPU 31 controls the direction in which the hull 13 moves by controlling the outboard motor 15 in the first mode. That is, the CPU 31 controls the outboard motor 15 by rotating the outboard motor 15 about the rotation center C2 in response to the operation of the steering wheel 18 to control the direction in which the hull 13 moves.

On the other hand, in step S403, the CPU 31 controls the direction in which the hull 13 moves by controlling the trim tab units 20A and 20B according to the operation of the steering wheel 18 in the second mode. Specifically, the CPU 31 first determines one of tabs 21A and 21B located on the same side as the operation direction of the steering wheel 18 as the tab to be actuated. Furthermore, the CPU 31 determines the actuation amount of the tab determined to actuated in accordance with the operation amount of the steering wheel 18. The operation amount is acquired from a change in the output signal of the steering angle sensor 35, for example. For example, the operation amount is acquired as a change amount from the end of the last actuation. Then, the CPU 31 controls one of the trim tab actuators 22A and 22B corresponding to the determined tab so as to actuate the determined tab by the determined actuation amount.

After steps S402 and S403, the CPU 31 executes, in step S404, other processing as in step S109. Next, in step S405, the CPU 31 determines whether or not an abnormality has occurred in a vessel maneuvering system of the outboard motor 15. The abnormality in the vessel maneuvering system of the outboard motor 15 described here is a case in which the outboard motor 15 does not normally rotate about the rotation center C2 in accordance with the operation of the steering wheel 18 and includes a case in which the steering by the outboard motor 15 does not work at all. That is, the CPU 31 determines whether or not an abnormality that the direction in which the hull 13 moves is not controlled with the steering wheel 18 according to a steering instruction, has occurred. The CPU 31 compares, for example, the change amount of the rotation position corresponding to a command based on the operation of the steering wheel 18 with the change amount of the rotation position of the outboard motor 15 about the rotation center C2, and determines that an abnormality has occurred if the difference between the two is equal to or greater than a predetermined value. Alternatively, the CPU 31 may determine that an abnormality has occurred when receiving an abnormality signal from any of the actuation systems.

If there is no abnormality in the vessel maneuvering system of the outboard motor 15 discovered as a result of the determination in step S405, the CPU 31 returns the process to step S401. If there is an abnormality in the vessel maneuvering system of the outboard motor 15, the CPU 31 determines in step S406 whether or not the current steering mode is the first mode. Then, if the current steering mode is not the first mode, the CPU 31 proceeds with the process to step S403. However, if the current steering mode is the first mode, the CPU 31 switches in step S407 the steering mode from the first mode to the second mode, and proceeds with the process to step S403.

If the engine 16 rotates and the propeller is rotatable, the driver is able to change the direction in which the hull 13 moves as desired by operating the steering wheel 18 to cause the actuation of the tabs 21A and 21B.

According to the third preferred embodiment, the CPU 31 switches the first mode to the second mode when determining that an abnormality that the direction in which the hull 13 moves is not controlled with the outboard motor 15 according to a steering instruction has occurred in the first mode. This allows the steering operation of the steering wheel 18 to be assisted where necessary. Even in a case of being not steered by the outboard motor 15 at all it is possible for a marine vessel to return to the port by the steering operation in the second mode. This is particularly effective in a marine vessel having only one outboard motor 15.

In the above preferred embodiments, the steering wheel 18 is exemplified as a steering control, but the steering control is not limited to this, and a joystick, for example, may be used.

It should be noted that interceptor tabs may be used as a substitute for the tabs 21A and 21B. Each interceptor tab in the water changes its position from a position at which it projects from a bottom surface (vessel's bottom) of the hull 13 to a position which is above the bottom surface of the hull 13 and at which it is retracted.

It should be noted that the number of the outboard motor 15 may be one or three or more. In addition, the number of the trim tab unit may be three or more.

It should be noted that the marine vessel according to each of the first and second preferred embodiments is not limited to a marine vessel including an outboard motor, and may be any marine vessel including a propulsion device that is able to change the trim angle. Accordingly, the marine vessel may be equipped with an inboard and outboard motor (sterndrive or inboard/outboard drive). In addition, the marine vessel according to the third preferred embodiment may be a marine vessel including another type of marine propulsion device such as an inboard and outboard motor, an inboard motor, and a water jet drive.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control system for posture control tabs of a marine vessel, the control system comprising:
    a port side posture control tab and a starboard side posture control tab respectively mounted on a port side and a starboard side of a stern of a hull to move up or down to control a posture of the hull;
    a port side actuator and a starboard side actuator to respectively actuate the port side posture control tab and the starboard side posture control tab; and
    a central processing unit configured or programmed to define and function as:
       an instruction acquisition unit to acquire a steering instruction provided by a steering control that provides instructions to control a direction in which the hull moves; and
       a processor to, upon the instruction acquisition unit acquiring the steering instruction provided by the steering control at a faster operation speed than a predetermined operation speed, execute a first control to:
          determine a posture control tab to be actuated among the port side posture control tab and the starboard side posture control tab based on a direction of a change in movement of the hull instructed by the steering instruction; and
          control one of the port side actuator and the starboard side actuator corresponding to the determined posture control tab so as to change a position of the determined posture control tab.

2. The control system according to claim 1, wherein, upon the instruction acquisition unit acquiring the steering instruction provided by the steering control at a faster operation speed than the predetermined operation speed, the processor:
    determines one of the port side posture control tab and the starboard side posture control tab, located on a same side as a direction of a change in movement of the hull instructed by the steering instruction, as a posture control tab to be actuated downward; and
    controls one of the port side actuator and the starboard side actuator corresponding to the determined posture control tab so as to move the determined posture control tab downward.

3. The control system according to claim 1, wherein the processor determines a change amount of a position of the determined posture control tab based on an operation speed of the steering control corresponding to the acquired steering instruction, either a speed of the hull or a number of revolutions of an engine of the propulsion device, and a pitch angle of the hull.

4. The control system according to claim 1, wherein
the central processing unit is configured or programmed to define and function as a roll angle acquisition unit to acquire a roll angle of the hull;
the processor includes a correction mode to execute a second control to, upon the roll angle acquired by the roll angle acquisition unit exceeding a certain angle during turning of the hull defined by a direction of a resultant force of a centrifugal force and gravity with a direction of gravity, control the port side actuator and the starboard side actuator to actuate the port side posture control tab and the starboard side posture control tab so as to make the roll angle approach the certain angle; and
the processor executes the first control upon the instruction acquisition unit acquiring the steering instruction during execution of the correction mode.

5. The control system according to claim 4, wherein, during execution of the second control in the correction mode, the processor controls the port side actuator and the starboard side actuator based on the acquired roll angle, either a speed of the hull or a number of revolutions of an engine of the propulsion device, and a pitch angle of the hull.

6. A marine vessel comprising:
a hull;
a steering control that provides instructions to control a direction in which the hull moves; and
the control system according to claim 1.

7. A method for controlling posture control tabs of a marine vessel, the marine vessel including a steering control that provides instructions to control a direction in which a hull moves, a port side posture control tab and a starboard side posture control tab respectively mounted on a port side and a starboard side of a stern of the hull to move up or down to control a posture of the hull, and a port side actuator and a starboard side actuator to respectively actuate the port side posture control tab and the starboard side posture control tab, the method comprising:
acquiring a steering instruction provided by the steering control; and
upon acquiring the steering instruction provided by the steering control at a faster operation speed than a predetermined operation speed, executing first control to:
determine a posture control tab to be actuated among the port side posture control tab and the starboard side posture control tab based on a direction of a change in movement of the hull instructed by the steering instruction; and
control one of the port side actuator and the starboard side actuator corresponding to the determined posture control tab so as to change a position of the determined posture control tab.

* * * * *